J. ROSS.
AUTOMOBILE WHEEL.
APPLICATION FILED APR. 23, 1915.
1,186,232.
Patented June 6, 1916.
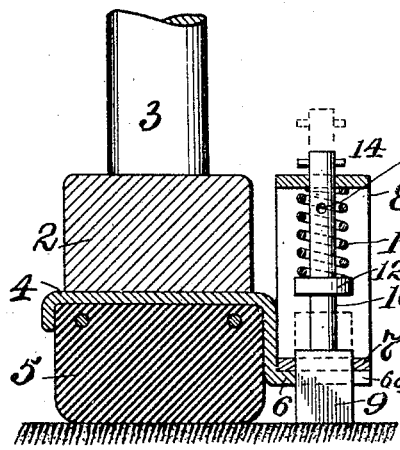
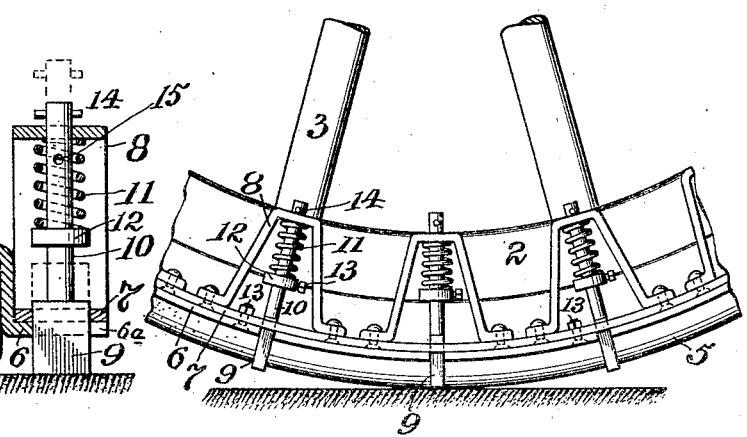
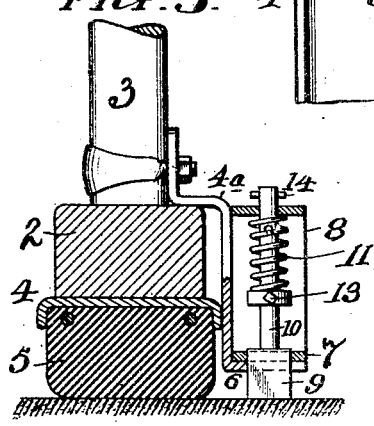
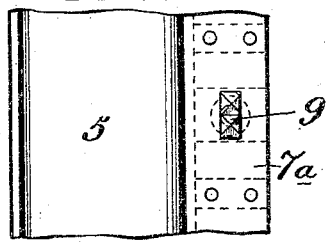
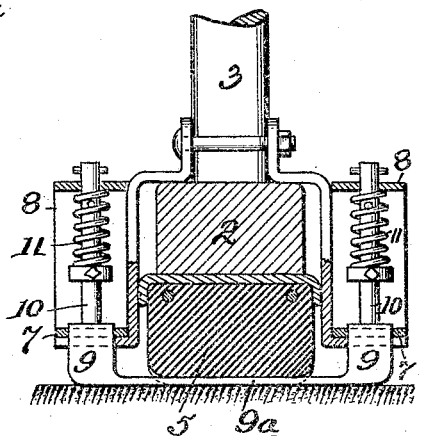
WITNESSES
INVENTOR
John Ross
BY
ATTORNEY

UNITED STATES PATENT OFFICE.

JOHN ROSS, OF PHILADELPHIA, PENNSYLVANIA.

AUTOMOBILE-WHEEL.

1,186,232.  Specification of Letters Patent.  Patented June 6, 1916.

Application filed April 23, 1915.  Serial No. 23,358.

*To all whom it may concern:*

Be it known that I, JOHN ROSS, a citizen of the United States, and resident of Philadelphia, county of Philadelphia, and State of Pennsylvania, have invented an Improvement in Automobile-Wheels, of which the following is a specification.

The object of my invention is to provide an automobile wheel with suitable mechanism to increase the traction thereof so that the duty accomplishable by the wheel may be increased over what would be the case where the ordinary friction between the tire and the ground would be relied upon, as is customary in rubber tired wheels whether of the cushion structure or pneumatic.

My present invention is particularly directed to the application of traction arms arranged about the side of the wheel close to the tire and adapted to make contact with the ground and be pressed into intimate contact by means of suitable springs carried on the wheel, whereby such traction arms are especially adapted for insuring a proper bite upon surfaces such as those which may be coated with hard snow or ice or otherwise of a slippery nature on which the wheel might slip or skid.

My object is also to provide a convenient manner of putting the traction arms into and out of operation, so that they may be put out of employment in localities or during periods of time when there would be no necessity for the use of such devices, and in this connection I may provide detachable means for the traction arms and their supports so that they may be applied or removed as a unit to the wheel.

With the above and other objects in view, the nature of which will be more fully understood from the description hereinafter, the invention consists in the novel construction of the tire as hereinafter more fully described and defined in the claims.

Referring to the drawings:—Figure 1 is a side elevation of the lower portion of a wheel embodying my invention; Fig. 2 is a transverse section of the same; Fig. 3 is a transverse section corresponding to Fig. 2, but showing a modified manner of attaching the traction devices; Fig. 4 is a plan view looking down upon the rim of the wheel and showing a modification of the traction devices; and Fig. 5 is a transverse section corresponding to Figs. 2 and 3 but showing a double arrangement of the traction devices with cross sections extending over the face of the rubber tire.

2 is the felly of the wheel and 3 the spokes thereof. Secured to this felly is the rim 4 which may be of the usual grooved form and carry the solid or other suitably constructed rubber tire 5.

As shown in Figs. 1 and 2, the rim 4 has one of its flanges extended radially outward, and then formed into a circumferential flange 6. In this manner the flange 6 extends comparatively close to the ground leaving only a portion of the rubber tire extending beyond its perimeter. This rim 6 is notched at intervals as shown at 6ª. Sleeved into the rim 6 is a ring 7 which is detachably secured in place by bolts 13 at intervals about the wheel. This ring 7 is provided at intervals with inwardly directed arch frames 8 which are riveted firmly in position. Slidingly supported and radially adjustable in the ring 7 and in the inner end of the arch frames 8, are the traction arms which comprise the wide rectangular portions 9 extending through rectangular apertures in the ring 7 and the cylindrical shank 10 guided through the inner end of the arch frames 8. In this way the traction arms are capable of radial reciprocation, but are held against turning. Pins 14 at the inner ends of the shank 10 limit the outward movement of the traction arms. Surrounding the shank 10 and adjustably clamped in position thereon is a collar 12 held by the clamping set screw 13. Between the collar 12 and the inner end of the arch frame 8 and surrounding the shank 10 is a coil spring 11 which acts as a buffer and tends to normally move the traction arm to its outermost position. By adjusting the collars 12 any degree of pressure may be applied by the spring 11. The ring with all of the traction arms may be detachably removed from the wheel flange 6 by simply removing the bolts 13 so that in summer time the traction devices may readily be removed. To slide the ring 7 and the traction arms carried thereby out of operative position with the flange 6, the slot 6ª in the latter is made open at the free end so as to allow the arms 9 to slide laterally outward.

In the use of the apparatus above described, it will be observed from Fig. 1, that as the wheel rotates the rectangular portions 9 of the traction arms come into contact with the ground and positively take hold thereon in such manner as to prevent skidding and also to increase the traction. It will be noted that the middle traction arm has been forced inward with the corresponding compression of its spring, whereas the other two traction arms respectively in front and rear are extended to their full extent. In this manner, one or more of the traction arms is always in contact with the ground, but at no time are they permitted to extend objectionably beyond the tread of the tire. The ends of the rectangular portions 9 may be shaped in any suitable manner to more positively grip the ground, this being indicated in plan in Fig. 4.

If it is desired to only temporarily put the traction arms out of operative condition, this may be accomplished by loosening the set screws 13 and pushing the traction arms 9, 10 radially inward until the hole 15 in the shank comes above the inner end of the arch frame, and in which position the arm may be retained by introducing an ordinary cotter pin or by shifting the pin 14 into this hole 15. When this is done, the collar 12 may be pushed up and again fastened to prevent rattling of the spring. In this way the traction arms are effectively put out of action and yet may be readily readjusted into operative position by the driver of the wagon with the most ordinary tools.

The importance of making the flange 6 of greater diameter than the normal diameter of the rim 4, holding the rubber tire, is to bring said flange 6 reasonably close to the ground so that in operation the traction effort acting upon the arm 9 will be well resisted close to the end of said arm, and in this manner prevent the bending of the traction arms, which bending would undoubtedly occur if said arms were guided farther from the ground and not made of objectionably great strength. By the construction here shown, the parts may be made reasonably light and yet have all the strength required. It will further be seen that by loosening the set screws 13 and driving out the pins 14, the traction arms may be instantly removed for replacement or repair and at nominal cost, which is an important feature in a device of this kind.

In the construction shown in Fig. 3, the only difference from that shown in Figs. 1 and 2 resides in the fact that the flange 6 holding the ring and traction arms is not made integral with the rim 4, but has extensions 4ª which are clamped to the wheel itself and preferably to the spokes 3 thereof.

In Fig. 4, the flange 7ª is intended to be integral with the tread 4 and also to carry the arch frames 8, and in this figure the traction arms 9 are shown as turned with the wide dimension parallel to the plane of the wheel, instead of being transverse thereto as indicated in Figs. 1 and 2. It is manifest that when the bolts 13 of Fig. 1 are tightened, the ring 7 and the flange 6 are substantially integral and may be considered as a permanent structure if so desired; for while the removability of the ring 7 with its attached arms is preferable, nevertheless in view of the capacity for adjustment of the arms to be put into or out of operative position, the ring 7 and flange 6 may be retained in permanent connection, in which case they might be considered as a unit, as indicated in Fig. 4.

In Fig. 5, I have illustrated the use of traction devices of the character above described as arranged upon each side of the wheel and its rubber tire. I have also shown the traction arms 9 at each side connected by a relatively thin transverse bar 9ª which extends over the rubber tire 5 and acts as a non-skidding device, the rubber spreading on each side of the said bars 9ª.

I have shown my invention in the preferred form which I have found excellently adapted for the purpose in commercial use, but I do not restrict myself to the minor details as these may be modified in various ways without departing from the spirit of the invention.

Having now described my invention, what I claim as new and desire to secure by Letters Patent, is:—

1. In a traction wheel, the combination of the wheel and its tire, with an annular flange arranged laterally with respect to the tire and relatively close to the circumferential portion thereof, a plurality of radially adjustable traction arms respectively having a rectangular traction body portion and a cylindrical shank, suitable guide framing carried by the flange for guiding the traction arms in a substantially radial direction and supporting them at points close to the perimeter of the wheel and ground, springs surrounding the cylindrical shank of the radially adjustable traction arms, means for limiting the outward movement of the traction arms and providing free inward movement, adjustable means for varying the tension of the springs consisting of an adjustable collar on the shank and means for adjusting the collar longitudinally of the shank, and means whereby the traction arms may be held in inoperative position when the collar is loosened and moved out of operative position.

2. In a traction wheel, the combination of the wheel and its tire, with an annular flange arranged laterally with respect to the tire and relatively close to the circumferential portion thereof, a plurality of radially adjustable traction arms, suitable guide framing carried by the flange for guiding the traction arms in a substantially radial direction and supporting them at points close to the perimeter of the wheel and ground, springs surrounding the cylindrical shank of the radially adjustable traction arms, means for limiting the outward movement of the traction arms, and means for removing the tension of the springs and adjusting the traction arms out of operative position.

3. In a traction wheel, the combination of the wheel and its tire, with an annular flange arranged laterally with respect to the tire and relatively close to the circumferential portion thereof, a plurality of radially adjustable traction arms, suitable guide framing carried by the flange for guiding the traction arms in a substantially radial direction and supporting them at points close to the perimeter of the wheel and ground, springs surrounding the radially adjustable traction arms, means for limiting the outward movement of the traction arms, and adjustable means for varying the tension of the springs, said guide framing detachably removable from the flange whereby the traction devices may be bodily removed and replaced from the wheel.

4. In a traction wheel, the combination of the wheel and its tire, with an annular flange arranged laterally with respect to the tire and relatively close to the circumferential portion thereof, said flange having a plurality of lateral slots opening transversely to the free edge thereof, an annular frame fitting within the flange and having a plurality of radial openings in alinement with the slots in the flange, a plurality of traction arms having rectangular outer portions guided through the apertures in the frame and the slots in the flange and provided with inwardly directed shanks guided in the frame, collars upon the shanks adjustably clamped thereto at a distance from the rectangular traction portions thereof, springs surrounding the shanks and between the collars and a portion of the frame whereby the traction arms are thrust outwardly with elastic pressure, and means on the inner ends of the shanks for limiting the outward movement of the traction arms upon the frame, the construction being such that the traction arms are adapted to press upon the ground with yielding pressure and the frame together with the traction arms may be removable laterally from the annular flange.

In testimony of which invention, I hereunto set my hand.

JOHN ROSS.

Witnesses:
R. M. HUNTER,
FLORENCE DEACON.